US012066174B2

(12) United States Patent
Hsu

(10) Patent No.: US 12,066,174 B2
(45) Date of Patent: Aug. 20, 2024

(54) CONNECTING MEMBER, LAMP AND CONNECTING MEMBER OF GROUND LAMPS

(71) Applicant: DONGGUAN JIA SHENG LIGHTING TECHNOLOGY CO., LTD, Dongguan (CN)

(72) Inventor: Shuisheng Hsu, Dongguan (CN)

(73) Assignee: DONGGUAN JIA SHENG LIGHTING TECHNOLOGY CO., LTD, Dongguan (CN)

( * ) Notice: Subject to any disclaimer, the term of this patent is extended or adjusted under 35 U.S.C. 154(b) by 346 days.

(21) Appl. No.: 17/701,691

(22) Filed: Mar. 23, 2022

(65) Prior Publication Data

US 2023/0220979 A1 Jul. 13, 2023

(30) Foreign Application Priority Data

Jan. 11, 2022 (CN) ......................... 202220069791.3

(51) Int. Cl.

| | |
|---|---|
| ***F21V 23/06*** | (2006.01) |
| ***H01R 4/2406*** | (2018.01) |
| ***H01R 13/58*** | (2006.01) |
| ***H01R 13/622*** | (2006.01) |
| ***H01R 33/22*** | (2006.01) |

(52) U.S. Cl.

CPC ........... *F21V 23/06* (2013.01); *H01R 4/2406* (2018.01); *H01R 13/58* (2013.01); *H01R 13/622* (2013.01); *H01R 33/22* (2013.01)

(58) Field of Classification Search

CPC ..... F21V 23/06; F21V 21/002; H01R 4/2406; H01R 13/58; H01R 13/622; H01R 33/22

See application file for complete search history.

(56) References Cited

U.S. PATENT DOCUMENTS

| | | | | |
|---|---|---|---|---|
| 10,468,788 | B1 * | 11/2019 | Shapnek .............. | H01R 4/2404 |
| 2011/0050081 | A1 * | 3/2011 | Lin ........................ | F21V 21/002 313/318.01 |
| 2013/0072050 | A1 * | 3/2013 | Andresen ............... | H01R 9/031 439/389 |
| 2022/0311178 | A1 * | 9/2022 | Chen .................... | H01R 4/2407 |

FOREIGN PATENT DOCUMENTS

| | | |
|---|---|---|
| CN | 2874261 Y | 2/2007 |
| CN | 205208345 U | 5/2016 |
| CN | 213184610 U | 5/2021 |
| TW | M374011 U1 | 2/2010 |

* cited by examiner

*Primary Examiner* — Travis S Chambers

(74) *Attorney, Agent, or Firm* — Andrew C. Cheng

(57) ABSTRACT

The present disclosure relates generally to the technical field of lamp fittings, and more particularly to a connecting member, a lamp and an connecting member of ground lamps. The connecting member includes a tube body and a fastening member. The tube body defines an axial hollow tube chamber and a gap communicated with the tube chamber. The fastening member is disposed in the tube chamber and corresponds to the gap. The fastening member comprises a limiting member and a conductive member movably connected to the limiting member. The limiting member is partially exposed from the gap and forms a supporting portion for supporting the power cable. The conductive member includes a pierce structure corresponding to the supporting portion. The connecting member provided by the present disclosure solves the technical problem of complicated wiring of ground lamps.

20 Claims, 11 Drawing Sheets

CONNECTING MEMBER, LAMP AND CONNECTING MEMBER OF GROUND LAMPS

TECHNICAL FIELD

The present disclosure relates generally to the technical field of lamp fittings, and more particularly to a connecting member, a lamp and an connecting member of ground lamps.

BACKGROUND

Ground lamps are often densely connected in series on the same power cable, or on several branch lines that are densely tapped from the main power cable. Because the ground lamps are densely connected in series or tapped on the same power cable, the wiring is very complicated, and the installation and fixing are inconvenient.

SUMMARY

In order to solve the technical problem that the wiring of ground lamps is complicated, the present disclosure provides a connecting member, a lamp and an connecting member of ground lamps.

To solve the technical problem, an embodiment of the present disclosure provides a connecting member for connecting a lamp body and a power cable. The connecting member includes a tube body and a fastening member. The tube body defines an axial hollow tube chamber and a gap communicated with the tube chamber. The fastening member is disposed in the tube chamber and corresponds to the gap. The fastening member includes a limiting member and a conductive member movably connected to the limiting member. The limiting member is partially exposed from the gap and forms a supporting portion for supporting the power cable. The conductive member includes a pierce structure corresponding to the supporting portion. When the connecting member connects the lamp body and the power cable, the distance between the limiting member and the conductive member reduces, and the pierce structure pierces the power cable supported on the supporting portion and is electrically connected to the power cable.

Preferably, a blocking element is disposed at an end of an inner wall of the tube chamber close to the conductive member. The blocking element is connected to an end of the conductive member away from the limiting member, to limit the conductive member. Or, a blocking element is disposed at an end of the inner wall of the tube chamber close to the limiting member. The blocking element is connected to an end of the limiting member away from the conductive member, to limit the limiting member.

Preferably, the blocking element is a protrusion disposed on the inner wall of the tube chamber. When the blocking element is disposed at the end of the inner wall of the tube chamber close to the limiting member, the blocking element abuts against the end of the limiting member away from the conductive member, to limit the limiting member. When the blocking element is disposed at the end of the inner wall of the tube chamber close to the conductive member, the blocking element abuts against the end of the conductive member away from the limiting member, to limit the conductive member.

Preferably, the protrusion may be spaced protrusions or an annular protrusion.

Preferably, two opposite ends of the limiting member and the conductive member are respectively provided with a limiting portion and a limiting slot that are structurally matched. The limiting portion slides in the limiting slot.

Preferably, the limiting portion is disposed at an end of the limiting member opposite to the conductive member. The limiting slot is defined at an end of the conductive member opposite to the limiting member. The limiting slot on the conductive member is provided with a first block at an end thereof close to the limiting member. The limiting portion on the limiting member is provided with a second block at an end thereof close to the conductive member. The first block abuts against the second block to limit the limiting portion in the limiting slot.

Preferably, the conductive member defines a groove at an end thereof close to the limiting member. The limiting member includes a lug corresponding to the groove, and a spring is sleeved on the lug. When the spring abuts against the bottom of the groove, the spring is deformed.

Preferably, the conductive member defines a wire hole corresponding to the supporting portion. The lamp body is electrically connected to the pierce structure via the wire hole to obtain power supply.

Preferably, the pierce structure includes at least two prods. The supporting portion defines at least two supporting places corresponding to the at least two prods.

Preferably, the number of the pods is two. The two pods are electrically connected to positive and negative electrodes of the power cable.

Preferably, the conductive member defines a wire hole corresponding to the supporting portion. The at least two prods are disposed in the wire hole and are detachably connected to the conductive member.

Preferably, a first protrusion is disposed between the at least two supporting places to separate the at least two supporting places.

Preferably, the conductive member includes a second protrusion thereon corresponding to and matching the first protrusion, for separating the at least two prods.

Preferably, a locking portion is formed at two opposite sides of the gap, for fixing the power cable. An angle is formed between the locking portion and the supporting portion.

Preferably, the locking portion is formed at a side of the gap away from the conductive member. The locking portion is an L-shaped crank arm formed by the tube body extending in a radial direction.

Preferably, an end of the tube body away from the blocking element is provided with threads, and an outer wall of the other end of the tube body is provided with threads, or a rotating element is disposed at the other end of the tube body.

To solve the above-mentioned technical problem, another embodiment of the present disclosure further provides a lamp. The lamp includes a lamp body and the above-mentioned connecting member. The lamp body is electrically connected to a power cable through the connecting member.

Preferably, the lamp further includes a base. The lamp body is detachably connected to the base through the connecting member. The lamp body is connected to an end of the connecting member close to the conductive member thereof. The base is detachably connected to an end of the connecting member close to the limiting member thereof. During the process of connecting the base and the connecting member, the base drives the limiting member to move toward the conductive member in a tube chamber, and a pierce structure pierces the power cable, so that the lamp body is electrically connected to the power cable through the pierce structure.

To solve the above-mentioned technical problem, another embodiment of the present disclosure further provides a connecting member of ground lamps, for electrically connecting a lamp body and a power cable. The connecting member of ground lamps includes a hollow tube body. The tube body defines a gap on a wall thereof communicated with the tube body. A pierce structure is disposed in the tube body, and a supporting portion is disposed opposite to the pierce structure on the tube body, which is removable relative to the pierce structure. When a power cable is located at the gap, and the supporting portion moves toward the pierce structure, the power cable can be supported by the supporting portion and the pierce structure pierces the power cable to electrically connect the lamp body and the power cable.

Preferably, the supporting portion is spaced to define at least two supporting places. The pierce structure includes at least two prods corresponding to the at least two supporting places.

Compared with the prior arts, the ceiling light and the adjustment method thereof provided in the present disclosure have the following beneficial effects.

An embodiment of the present disclosure provides a connecting member for connecting a lamp body and a power cable. The connecting member includes a tube body and a fastening member. The tube body defines an axial hollow tube chamber, and a gap communicated with the tube chamber. The fastening member is disposed in the tube chamber and corresponds to the gap. The fastening member includes a limiting member, and a conductive member movably connected to the limiting member. The limiting member is partially exposed from the gap and forms a supporting portion for supporting the power cable. The conductive member includes a pierce structure corresponding to the supporting portion. When the connecting member connects the lamp body and the power cable, the distance between the limiting member and the conductive member reduces, and the pierce structure pierces the power cable supported on the supporting portion and is electrically connected to the power cable; so that when using the connecting member, there is no need to manually connect the conductive member and the power cable electrically, which solves the technical problem of the complicated wiring of the ground lamps.

The tube chamber includes a blocking element at an end of the inner wall thereof close to the conductive member. The blocking element is connected to an end of the conductive member away from the limiting member, to limit the conductive member. Or, the tube chamber includes the blocking element at an end of the inner wall thereof close to the limiting member. The blocking element is connected to an end of the limiting member away from the conductive member, to limit the limiting member. The blocking element enables the conductive member or the limiting member to abut against the tube body, so that the conductive member or the limiting member will not fall off from the tube body during the connection of the limiting member and the conductive member.

Two opposite ends of the limiting member and the conductive member are respectively provided with a limiting portion and a limiting slot that are structurally matched. The limiting portion slides in the limiting slot. The limiting portion and the limiting slot can limit the connection of the conductive member and the limiting member. The limiting portion and the limiting slot are slidably connected, so that the limiting member and the conductive member are prevented from moving relative to each other in the radial direction of the tube body in the tube chamber. The positions of the conductive member and the limiting member are relatively stable without deviation, so that the pierce structure can pierce the power cable more precisely.

The limiting portion is disposed at an end of the limiting member opposite to the conductive member. The limiting slot is defined at an end of the conductive member opposite to the limiting member. The limiting slot on the conductive member is provided with a first block at an end thereof close to the limiting member. The limiting portion on the limiting member is provided with a second block at an end thereof close to the conductive member. The first block abuts against the second block to limit the limiting portion in the limiting slot. The first block and the second block enables that the limiting portion is not easy to fall off from the limiting slot, so that the functions of the limiting portion and the limiting slot are more stable.

The conductive member defines a groove at an end thereof close to the limiting member. The limiting member includes a lug corresponding to the groove. A spring is sleeved on the lug. When the spring is deformed, the spring abuts against the bottom of the groove. After using the connecting member, the spring enables itself to restore elastic deformation in the case that the conductive member and the limiting member are not subject to external force and limited to external object, thereby generating elastic force to reset the conductive member and the limiting member, so that the pierce structure is separated from the power cable, which makes the process of resetting the conductive member and the limiting member convenient and simple. There is no need for the user to manually reset the conductive member and the limiting member.

The pierce structure includes at least two prods. The supporting portion defines at least two supporting places corresponding to the at least two prods. The at least two prods respectively pierce the positive and negative power cables. The design of setting the supporting places corresponding to the number of the prods can distinguish and limit the positive and negative power cables, so as to prevent the positive and negative power cables from being offset on the supporting portion and/or being short-circuited as pierced by the same prod.

A locking portion is formed at two opposite sides of the gap, for fixing the power cable. An angle is formed between the locking portion and the supporting portion. The angle formed between the locking portion and the supporting portion enables the locking portion to limit the power cable better, which prevents the power cable from being offset on the supporting portion and falling off from the supporting portion naturally.

The locking portion is formed at a side of the gap away from the conductive member. The locking portion is an L-shaped crank arm formed by the tube body extending in a radial direction. The design that the locking portion is an L-shaped crank arm enables the locking portion limit the power cable to the maximum extent, which prevents the power cable from being offset on the supporting portion and falling off from the supporting portion naturally.

Another embodiment of the present disclosure provides a lamp. The lamp includes a lamp body and the above-mentioned connecting member. The lamp body is electrically connected to a power cable through connecting member. The lamp includes the above-mentioned connecting member and has the same beneficial effects as the above-mentioned connecting member, which will not be repeated here.

NUMERICAL REFERENCE IDENTIFICATION

Figure 1:
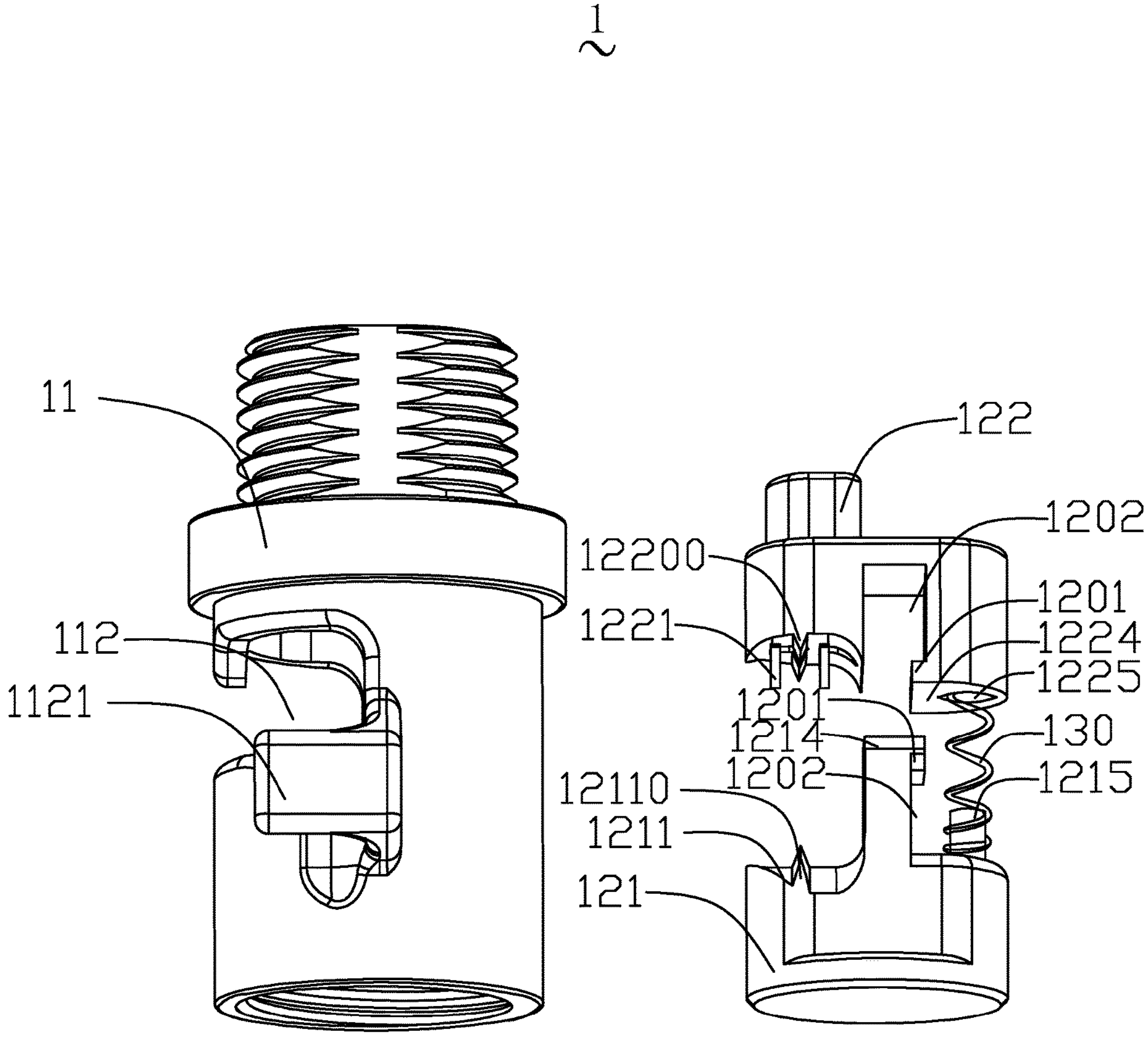
FIG. 1 is an exploded schematic diagram of a connecting member according to a first embodiment of the present disclosure.

1. connecting member; 3. lamp body
11. tube body; 12. fastening member;
111. tube chamber; 112. gap; 113. blocking element; 114. rotating element; 121. limiting member; 122. conductive member; 130. spring;
1121. locking portion; 1140. connecting hole; 1201. limiting portion; 1202. limiting slot; 1211. supporting portion; 1214. second block; 1215. lug; 1221. pierce structure; 1224. first block; 1225. groove; 1226. wire hole; 3000. clamping member; 3001. connecting component;
12110. first protrusion; 12111. supporting place; 12200. second protrusion; 12211. prod;
2. lamp;
21. connecting member; 22. base; 23. lamp body; 24. power cable;
2111. tube chamber; 2121. limiting member; 2122. conductive member; 21221. pierce structure.

DETAILED DESCRIPTION

In order to make the objectives, technical solutions, and advantages of the present disclosure clearer, the present disclosure is further described in detail below with reference to the accompanying drawings and embodiments. It should be understood that the specific embodiments described herein are provided for illustration only, and not for the purpose of limiting the disclosure.

It should be noted that, the terms "first" and "second" in the description and claims of the present disclosure are used to distinguish different objects, rather than to describe a specific order.

It should be noted that, when an element is considered to be "fixed" to another element, it can be directly fixed on another element or a centered element is arranged between the element and another element. When an element is considered to be "connected" to another element, it can be directly connected to another element or there can also have a centered element. It should be further noted that terms such as "vertical", "horizontal", "left", "right" or the like are just used to facilitate description of the present disclosure.

In the present disclosure, the orientation and position relationship indicated by the terms "up", "down", "left", "right", "front", "rear", "top", "bottom", "inner", "outer", "middle", "vertical", "horizontal", "transverse", "longitudinal", etc. are based on the orientation and position relationship shown in the drawings. These terms are primarily used to better describe the present disclosure and its embodiments, and are not intended to limit that the indicated device, element or component must have a particular orientation, or be configured and operated in a particular orientation.

In addition, some of the above-mentioned terms may be used to express other meanings besides orientation or position relationship. For example, the term "up" may also be used to express a certain attachment or connection relationship in some cases. For those skilled in the art, the specific meanings of these terms in the present disclosure can be understood according to specific situations.

Furthermore, the terms "mount", "dispose", "provide", "connect", "attach" should be construed broadly. For example, it may be a fixed connection, a detachable connection, or an integral structure; it may be a mechanical connection, or an electrical connection; it may be a direct connection, or an indirect connection through an intermediary, or an internal communication between two devices, elements or components. For those skilled in the art, the specific meanings of the above terms in the present disclosure can be understood according to specific situations.

Figure 2:
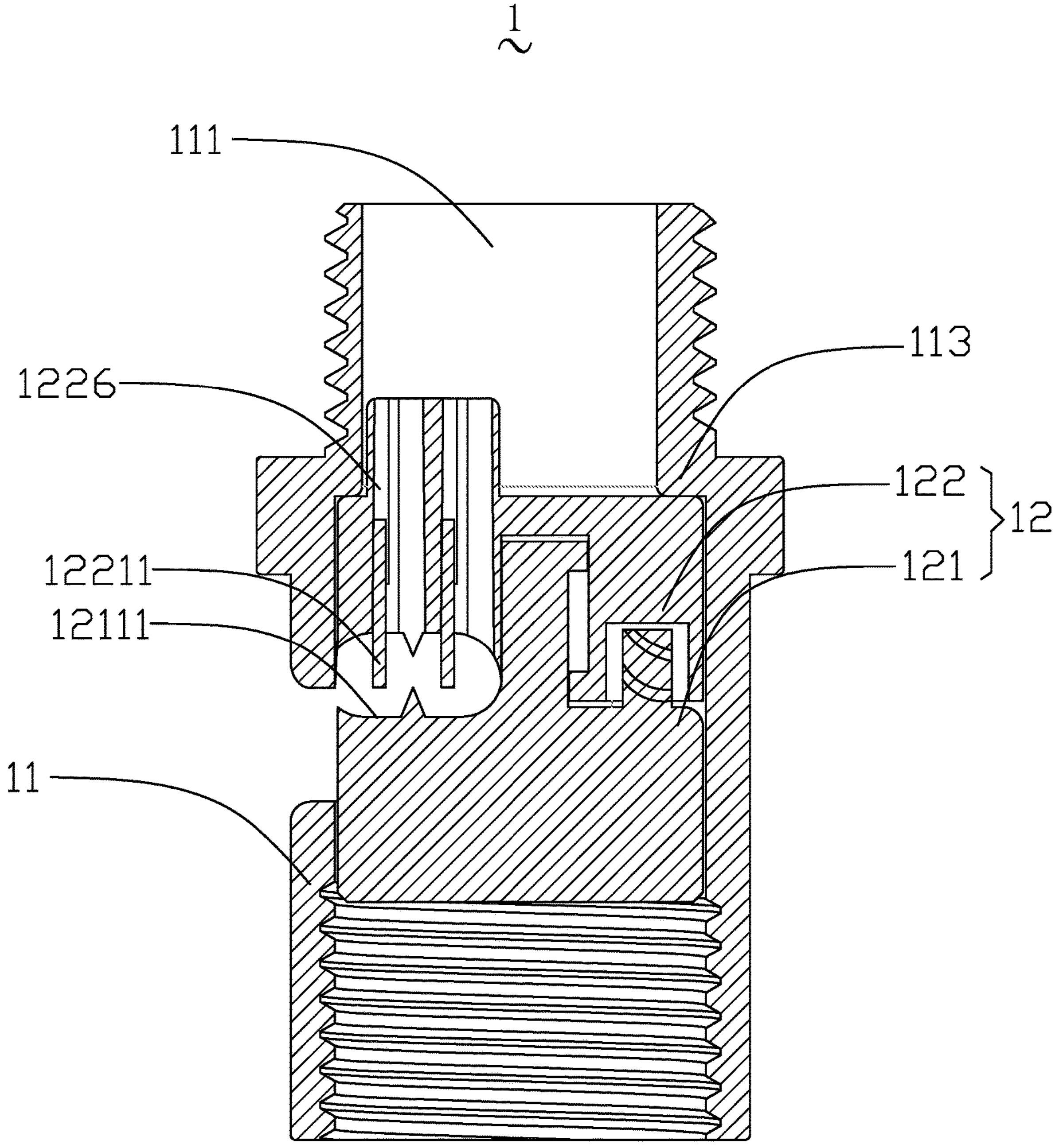
FIG. 2 is a cross-sectional schematic diagram of the connecting member according to the first embodiment of the present disclosure.

Referring to FIG. 1 and FIG. 2, specifically, a first embodiment of the present disclosure provides a connecting member 1 for connecting a lamp body and a power cable. The connecting member 1 includes a tube body 11 and a fastening member 12. The tube body 11 defines an axial hollow tube chamber 111, and a gap 112 communicated with the tube chamber 111. The fastening member 12 is disposed in the tube chamber 111 and corresponds to the gap 112. The fastening member 12 includes a limiting member 121, and a conductive member 122 movably connected to the limiting member 121. The limiting member 121 is partially exposed from the gap 112 and forms a supporting portion 1211 for supporting the power cable. The conductive member 122 includes a pierce structure 1221 corresponding to the supporting portion 1211. When the connecting member 1 connects the lamp body and the power cable, the distance between the limiting member 121 and the conductive member 122 reduces, and the pierce structure 1221 pierces the power cable supported on the supporting portion 1211 and is electrically connected to the power cable.

It can be understood that, when the connecting member 1 connects the lamp body and the power cable, the distance between the limiting member 121 and the conductive member 122 reduces, and the pierce structure 1221 pierces the power cable supported on the supporting portion 1211 and is electrically connected to the power cable, so that when using the connecting member 1, there is no need to manually connect the conductive member 122 and the power cable electrically, which solves the technical problem of the complicated wiring of the ground lamps.

Specifically, a blocking element 113 is disposed at an end of the inner wall of the tube chamber 111 close to the conductive member 122. The blocking element 113 is connected to an end of the conductive member 122 away from the limiting member 121, to limit the conductive member 122. Or, a blocking element 113 is disposed at an end of the inner wall of the tube chamber 111 close to the limiting member 121. The blocking element 113 is connected to an end of the limiting member 121 away from the conductive member 122, to limit the limiting member 121.

It can be understood that, the blocking element 113 enables the conductive member 122 or the limiting member 121 to abut against the tube body 11, so that the conductive member 122 or the limiting member 121 will not fall off from the tube body 11 during the connection of the limiting member 121 and the conductive member 122.

It should be noted that, the present disclosure does not impose any limitation on the position of the blocking element 113. The blocking element 113 can be disposed at the end of the inner wall of the tube chamber 111 close to the conductive member 122, and the blocking element 113 is connected to the end of the conductive member 122 away from the limiting member 121, to limit the conductive member 122. The blocking element 113 can also be disposed at the end of the inner wall of the tube chamber 111 close to the limiting member 121, and the blocking element 113 is connected to the end of the limiting member 121 away from the conductive member 122, to limit the limiting member 121. Specifically, in this embodiment, the blocking element 113 is disposed at the end of the tube body 11 close to the conductive member 122, and the blocking element 113 is connected to the end of the conductive member 122 away from the limiting member 121, to limit the conductive member 122.

It should be further noted that, when the blocking element 113 is disposed at the end of the tube body 11 close to the conductive member 122, and the connecting member 1 connects the lamp body and the power cable, a base connected to an end of the connecting member 1 close to limiting member 121 is required. During the connection of the base and the connecting member 1, the base drives the limiting member 121 to move toward the conductive member 122 in the tube chamber 111, and the pierce structure 1221 pierces the external power cable so that the lamp body is electrically connected to the power cable through the pierce structure 1221.

Specifically, the blocking element 113 is a protrusion disposed on the inner wall of the tube chamber 111. When the blocking element 113 is disposed at the end of the inner wall of the tube chamber 111 close to the limiting member 121, the blocking element 113 abuts against the end of the limiting member 121 away from the conductive member 122, to limit the limiting member 121. When the blocking element 113 is disposed at the end of the inner wall of the tube chamber 111 close to the conductive member 122, the blocking element 113 abuts against the end of the conductive member 122 away from the limiting member 121, to limit the conductive member 122.

It should be noted that, the present disclosure does not impose any limitation on the shape of the blocking element 113. The blocking element 113 may be spaced protrusions on the inner wall of the tube chamber 111, or the blocking element 113 may be an annular protrusion surrounding the inner wall of the tube chamber 111, as long as the blocking element 113 can limit the conductive member 122 or the limiting member 121. Specifically, in this embodiment, the blocking element 113 is an annular protrusion surrounding the inner wall of the tube body 11.

Figure 3:
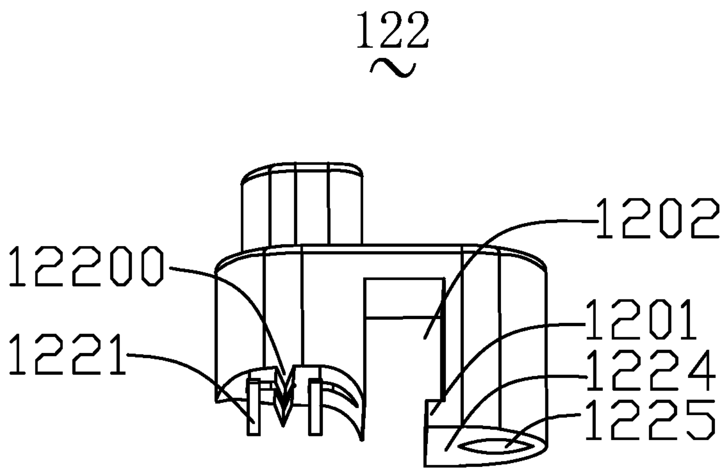
FIG. 3 is a perspective view of a conductive member of the connecting member according to the first embodiment of the present disclosure.
Figure 4:
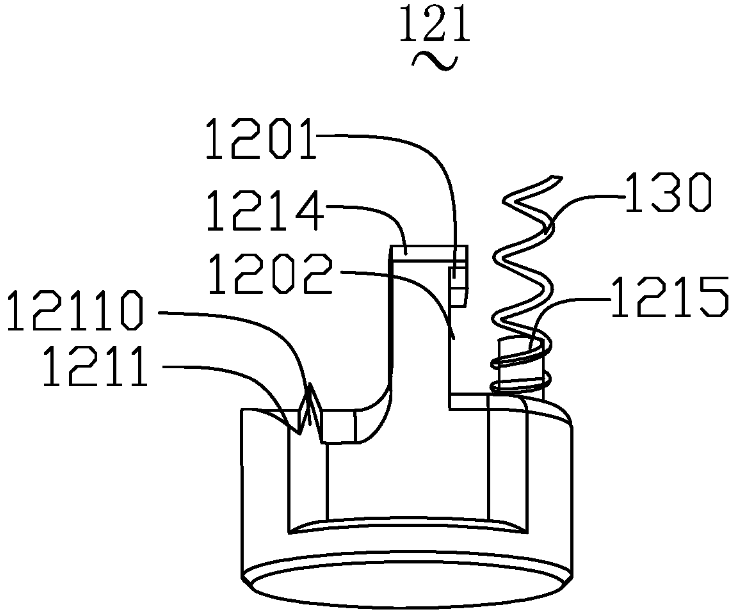
FIG. 4 is a perspective view of a limiting member of the connecting member according to the first embodiment of the present disclosure.

Referring to FIG. 3 and FIG. 4, specifically, two opposite ends of the limiting member 121 and the conductive member 122 are respectively provided with a limiting portion 1201 and a limiting slot 1202 that are structurally matched. The limiting portion 1201 slides in the limiting slot 1202.

It can be understood that, the limiting portion 1201 and the limiting slot 1202 can limit the connection of the conductive member 122 and the limiting member 121. The limiting portion 1201 and the limiting slot 1202 are slidably connected, so that the limiting member 121 and the conductive member 122 are prevented from moving relative to each other in the radial direction of the tube body 11 in the tube chamber 111. The positions of the conductive member 122 and the limiting member 121 are relatively stable without deviation, so that the pierce structure 1221 can pierce the power cable more precisely.

Further, the limiting portion 1201 is disposed at an end of the limiting member 121 opposite to the conductive member 122. The limiting slot 1202 is defined at an end of the conductive member 122 opposite to the limiting member 121. The limiting slot 1202 on the conductive member 122 is provided with a first block 1224 at an end thereof close to the limiting member 121. The limiting portion 1201 on the limiting member 121 is provided with a second block 1214 at an end thereof close to the conductive member 122. The first block 1224 abuts against the second block 1214 to limit the limiting portion 1201 in the limiting slot 1202.

It can be understood that, the first block 1224 and the second block 1214 enables that the limiting portion 1201 is not easy to fall off from the limiting slot 1202, so that the functions of the limiting portion 1201 and the limiting slot 1202 are more stable.

Specifically, the conductive member 122 defines a groove 1225 at an end thereof close to the limiting member 121. The limiting member 121 includes a lug 1215 corresponding to the groove 1225. A spring 130 is sleeved on the lug 1215. When the spring 130 is deformed, the spring 130 abuts against the bottom of the groove 1225.

It can be understood that, after using the connecting member 1, the spring 130 enables itself to restore elastic deformation in the case that the conductive member 122 and the limiting member 121 are not subject to external force and limited to external object, thereby generating elastic force to reset the conductive member 122 and the limiting member 121, so that the pierce structure 1221 is separated from the power cable, which makes the process of resetting the conductive member 122 and the limiting member 121 convenient and simple. There is no need for the user to manually reset the conductive member 122 and the limiting member 121.

Referring to FIGS. 2-4, specifically, the conductive member 122 defines a wire hole 1226 corresponding to the supporting portion 1211. The lamp body 3 is electrically connected to the pierce structure 1221 via the wire hole 1226 to obtain power supply, meanwhile, the wire hole 1226 protects the wire connecting the lamp body to the external power source.

Further, the pierce structure 1221 includes at least two prods 12211. The supporting portion 1211 defines at least two supporting places 12111 corresponding to the at least two prods 12211.

It can be understood that, the at least two prods 12211 respectively pierce the positive and negative power cables. The design of setting the supporting places 12111 corresponding to the number of the prods 12211 can distinguish and limit the positive and negative power cables, so as to prevent the positive and negative power cables from being offset on the supporting portion 1211 and/or being short-circuited as pierced by the same prod 12211.

It should be noted that, the present disclosure does not impose any limitation on the number of the prods 12211, as long as the at least two prods 12211 respectively pierce the positive and negative power cables. Specifically, in this embodiment, the number of the prods 12211 is two.

Specifically, The supporting portion 1211 includes a first protrusion 12110 thereon in a direction toward the conductive member 122. The first protrusion 12110 divides the supporting portion 1211 into multiple supporting places 12111. The number and position of the supporting places 12111 correspond to the prods 12211.

It can be understood that, the first protrusion 12110 distinguishes and limits the positive and negative power cables when the power cable is placed on the supporting portion 1211, so as to prevent the positive and negative power cables from being offset on the supporting portion 1211.

Further, the conductive member 122 includes a second protrusion 12200 thereon corresponding to and matching the first protrusion 12110. The second protrusion 12200 is used to separate adjacent prods 12211.

It can be understood that, the second protrusion 12200 separates the prods 12211 so that the prods 12211 respectively correspond to the supporting places 12111, which can avoid that the power cables on different supporting places 12111 are pierced by the same prod 12211 and short-circuited.

Preferably, the prods 12211 is disposed in the wire hole 1226 and is detachably connected to the conductive member 122.

It should be noted that, the present disclosure does not impose any limitation on the connection method of the prods 12211 and the conductive member 122. The prods 12211 can be fixedly disposed at an end of the conductive member 122 close to the wire hole 1226. The prods 12211 can also be separate workpiece disposed in the wire hole 1226 and detachably connected to the conductive member 122. As long as the lamp body 3 can be electrically connected to the pierce structure 1221 through the conductive member 122, and further electrically connected to the power cable. Specifically, in this embodiment, the prods 12211 are separate workpiece disposed in the wire hole 1226 and detachably connected to the conductive member 122.

Figure 5:
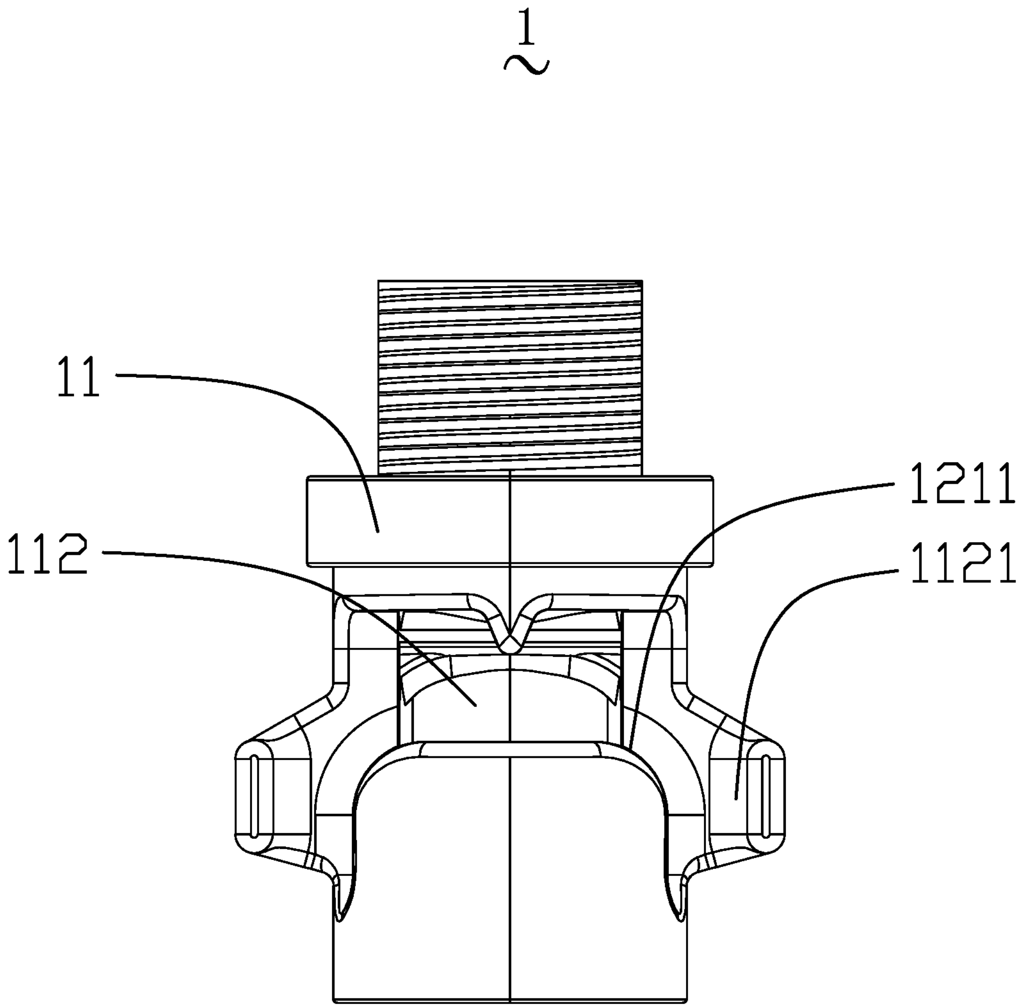
FIG. 5 is a front perspective view of the connecting member according to the first embodiment of the present disclosure.

Referring to FIG. 5, specifically, a locking portion 1121 is formed at two opposite sides of the gap 112, for fixing the power cable. An angle is formed between the locking portion 1121 and the supporting portion 1211.

It can be understood that, the angle formed between the locking portion 1121 and the supporting portion 1211 enables the locking portion 1121 to limit the power cable better, which prevents the power cable from being offset on the supporting portion 1211 and falling off from the supporting portion 1211 naturally.

Further, the locking portion 1121 is formed at a side of the gap 112 away from the conductive member 122. The locking portion 1121 is an L-shaped crank arm formed by the tube body 11 extending in a radial direction.

It can be understood that, the design that the locking portion 1121 is an L-shaped crank arm enables the locking portion 1121 limit the power cable to the maximum extent, which prevents the power cable from being offset on the supporting portion 1211 and falling off from the supporting portion 1211 naturally.

It should be noted that, the present disclosure does not impose any limitation on the shape of the locking portion 1121. The locking portion 1121 can be any shapes such as curved, L-shaped or I-shaped. Specifically, in this embodiment, the locking portion 1121 is an L-shaped crank arm.

Specifically, the inner wall of the tube chamber 111 at an end of the tube body 11 away from the blocking element 113 is provided with threads. The outer wall of the other end of the tube body 11 is provided with threads, or the other end of the tube body 11 is provided with a rotating element 114.

Figure 6:
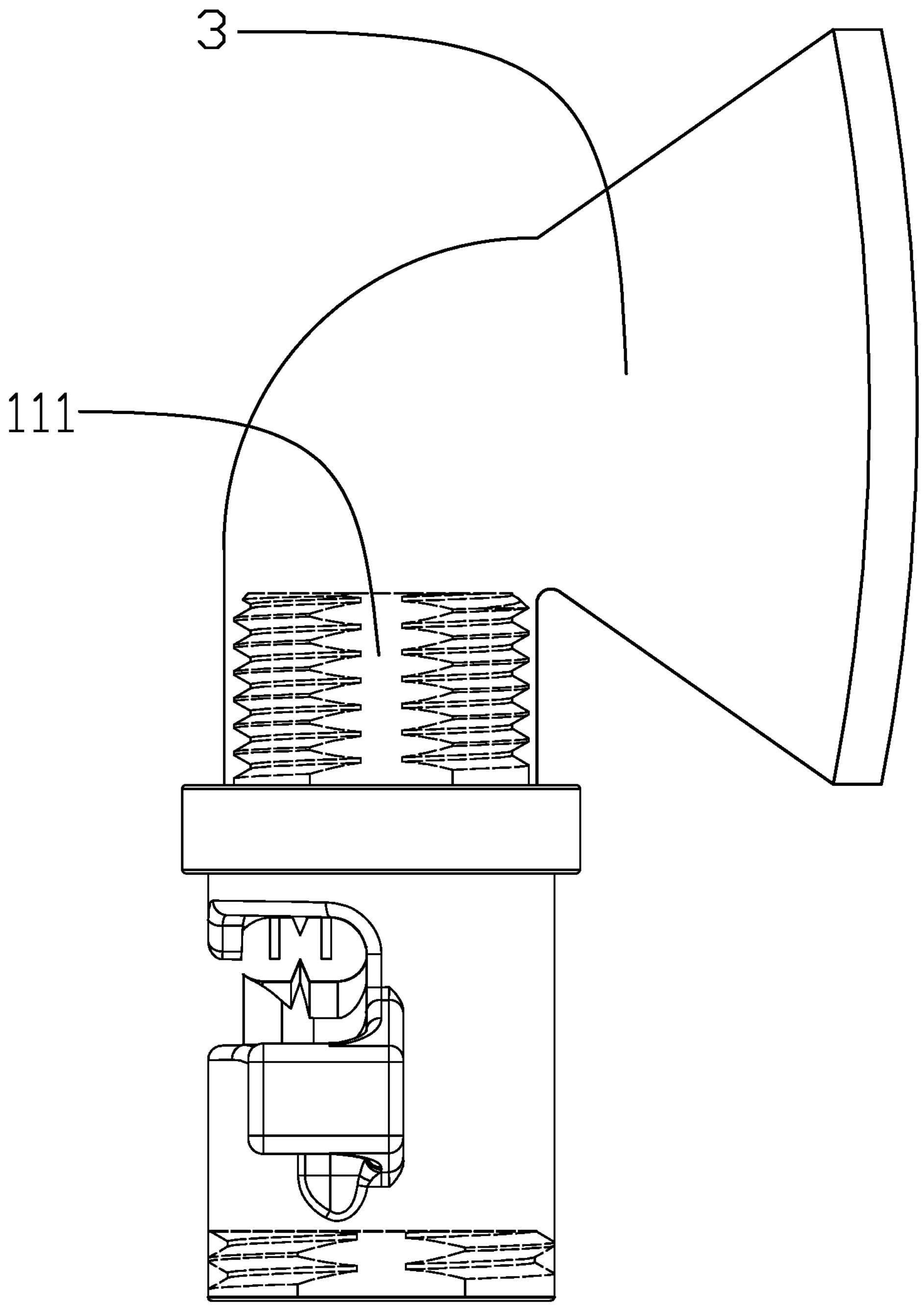
FIG. 6 is a perspective view of a connection method of the connecting member and a lamp body according to the first embodiment of the present disclosure.

Referring to FIG. 2 and FIG. 6, when the inner wall of the tube chamber 111 at the end of the tube body 11 away from the blocking element 113 is provided with threads, the outer wall of the other end of the tube body 11 is provided with threads, and the blocking element 113 is disposed at the end of the inner wall of the tube chamber 111 close to the conductive member 122, the end of the outer wall of the tube body 11 provided with threads can be connected to the directional lamp body in a thread manner. The conductive wire of the lamp body 3 is electrically connected to the pierce structure 1221 via the wire hole 1226 defined on the conductive member 122.

Figure 7:
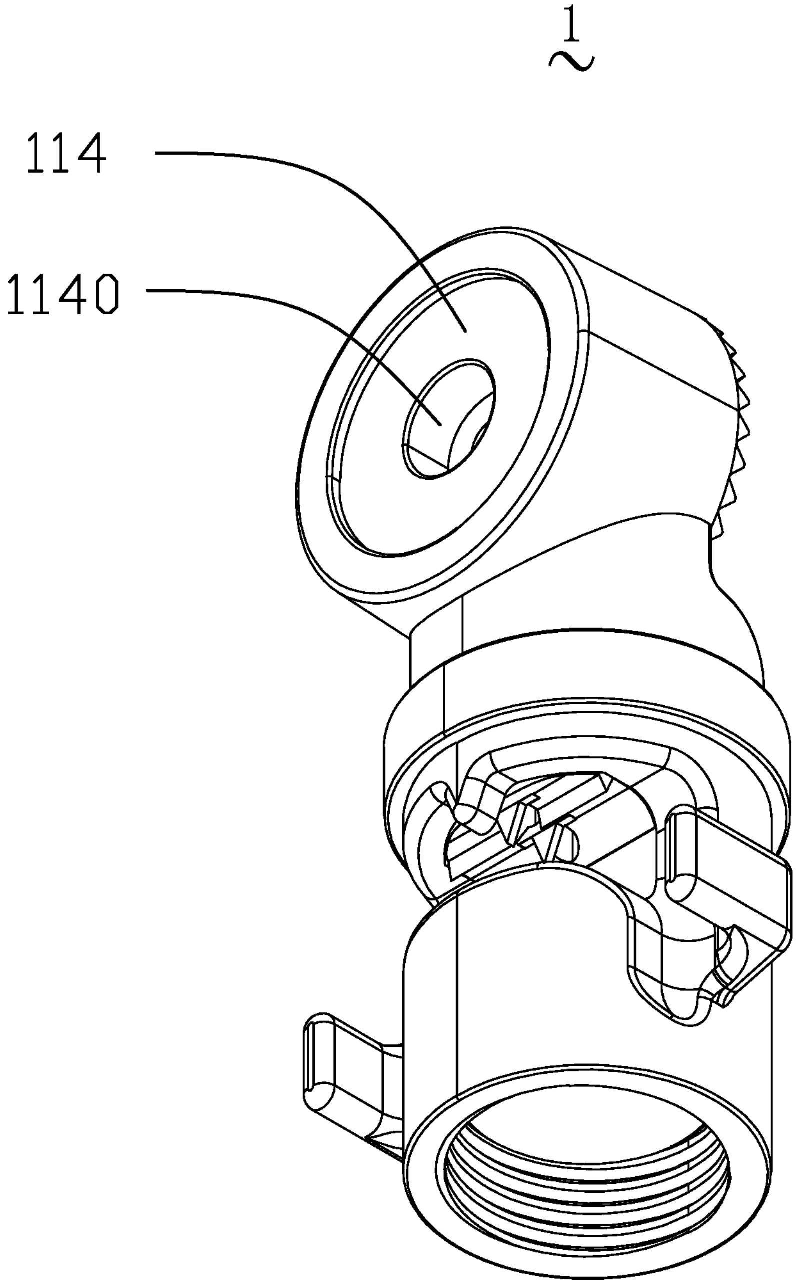
FIG. 7 is a perspective view of a universal connecting member of the connecting member according to the first embodiment of the present disclosure.
Figure 8:
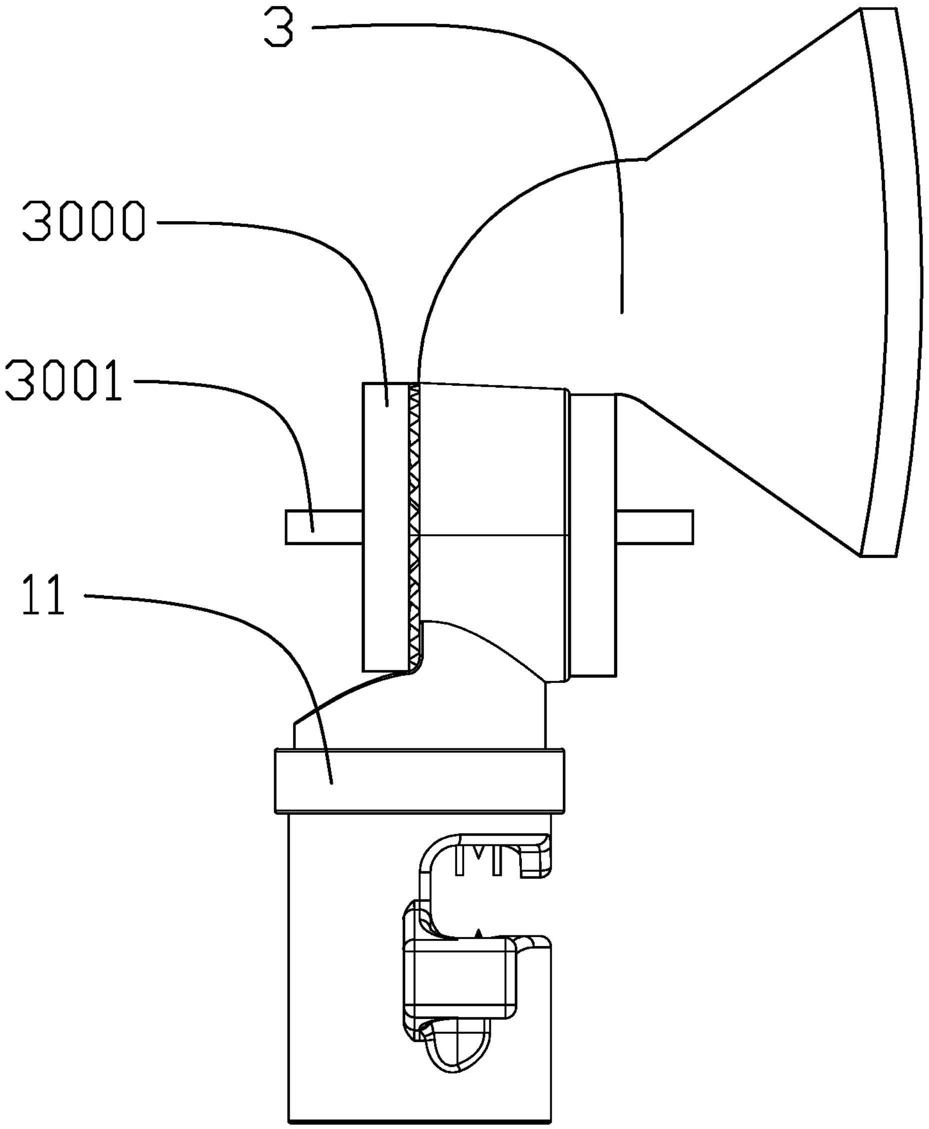
FIG. 8 is another perspective view of the connection method of the connecting member and a lamp body according to the first embodiment of the present disclosure.

Referring to FIGS. 2, 7 and 8, when the inner wall of the tube chamber 111 at the end of the tube body 11 away from the blocking element 113 is provided with threads, the end of the tube body 11 close to the conductive member 122 is provided with the rotating element 114, and the blocking element 113 is disposed at the end of the inner wall of the tube chamber 111 close to the conductive member 122, the tube body 11 can be detachably connected to the universal lamp body 3 through the rotating element 114. The rotating element 114 defines a connecting hole 1140. The lamp body 3 includes a connecting component 3001 matching the connecting hole 1140, and a clamping member 3000 disposed at the bottom of the lamp body 3. The clamping member 3000 clamps the rotating element 114 and is detachably connected to the rotating element 114 through the connecting component 3001. The lamp body 3 can rotate around the rotating element 114 with the connecting member 1 as the axis. The conductive wire of the lamp body 3 is electrically connected to the pierce structure 1221 via the wire hole 1226.

Figure 9:
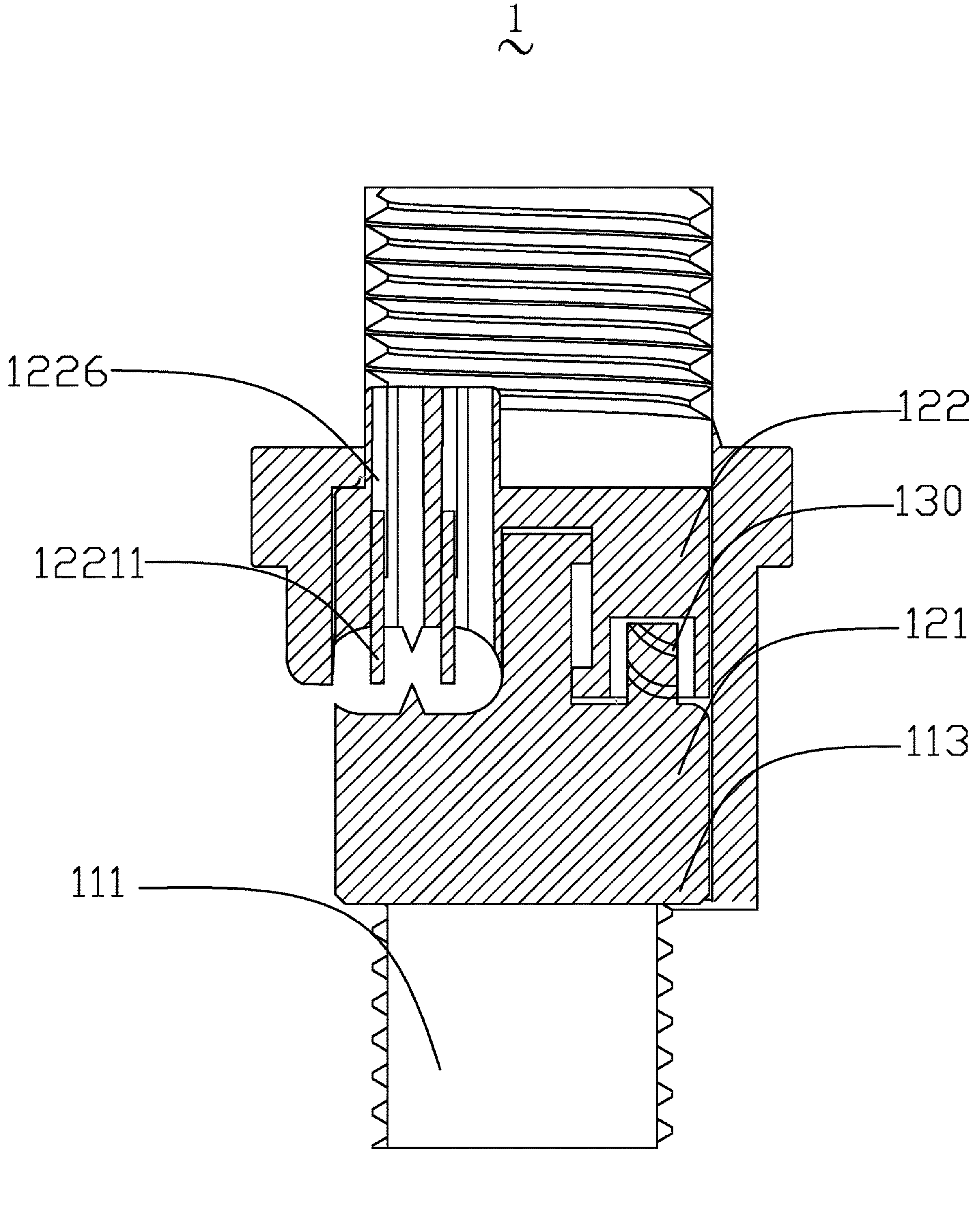
FIG. 9 is another cross-sectional schematic diagram of the connecting member according to the first embodiment of the present disclosure.
Figure 10:
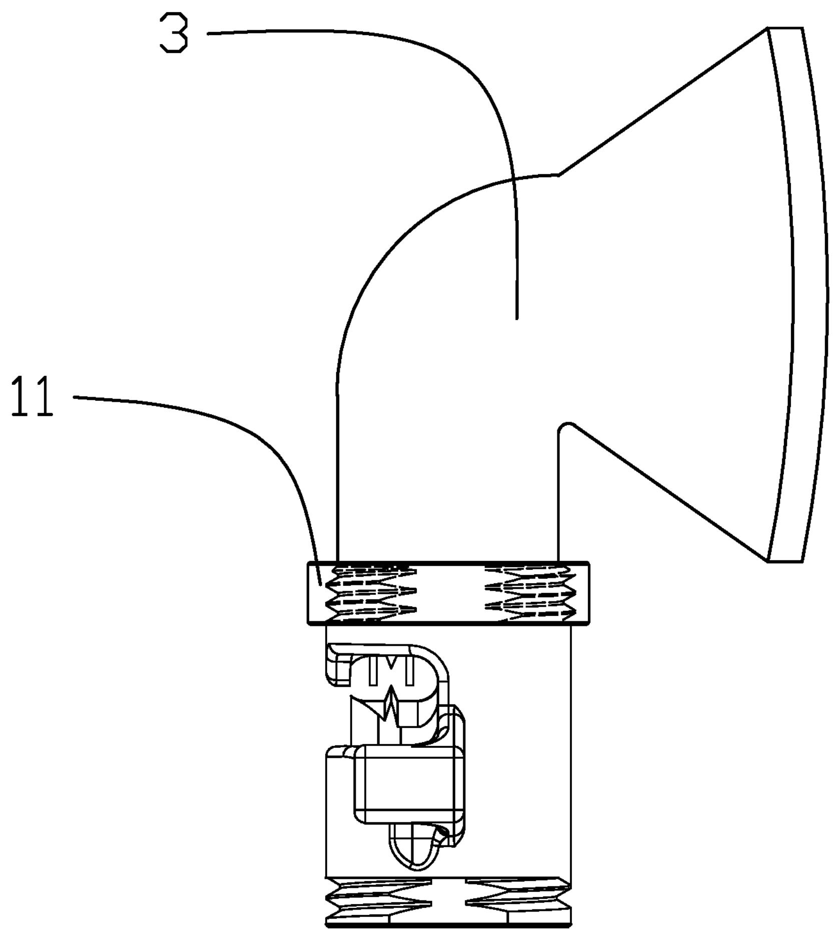
FIG. 10 is another perspective view of the connection method of the connecting member and a lamp body according to the first embodiment of the present disclosure.

Referring to FIG. 9 and FIG. 10, when the end of the inner wall of the tube chamber 111 away from the blocking element 113 is provided with threads, the outer wall of the other end of the tube body 11 is provided with threads, and the blocking element 113 is disposed at the end of the inner wall of the tube chamber 111 close to the limiting member 121, the lamp body 3 is connected to the end of the inner wall of the tube body 11 provided with threads in a thread manner. The conductive wire of the lamp body 3 is electrically connected to the pierce structure 1221 via the wire hole 1226 defined on the conductive member 122.

It should be noted that, the present disclosure does not impose any limitation on the design of the two ends of the tube body 11 and the connection method with the lamp body 3. The tube body 11 can be provided with threads only at the end of the inner wall of the tube chamber 111, or provided with threads at two sides of the inner wall of the tube chamber 111, as long as the connecting member 1 connects the lamp body and the power cable. The distance between the limiting member 121 and the conductive member 122 reduces, and the pierce structure 1221 pierces the power cable supported on the supporting portion 1211 and is electrically connected to the power cable. As long as the lamp body can be electrically connected to the pierce structure 1221 on the connecting member 1.

Above all, the process that the connecting member 1 connects the lamp body and the power cable is as follows. The conductive member 122 and the limiting member 121 are movably connected and disposed in the tube chamber 111. The end of the conductive member 122 away from the limiting member 121 abuts against the blocking element 113. The lamp body is connected to the end of the connecting member 1 close to the conductive member 122, and the lamp body is electrically connected to the prods 12211 via the wire hole 1226. The power cable is placed on the supporting places 12111 through the gap 112. As the distance between the limiting member 121 and the conductive member 122 reduces, the pierce structure 1221 pierces the power cable supported on the supporting portion 1211 and is electrically connected to the power cable, so that the lamp body is electrically connected to the power cable through the pierce structure 1221.

Figure 11:
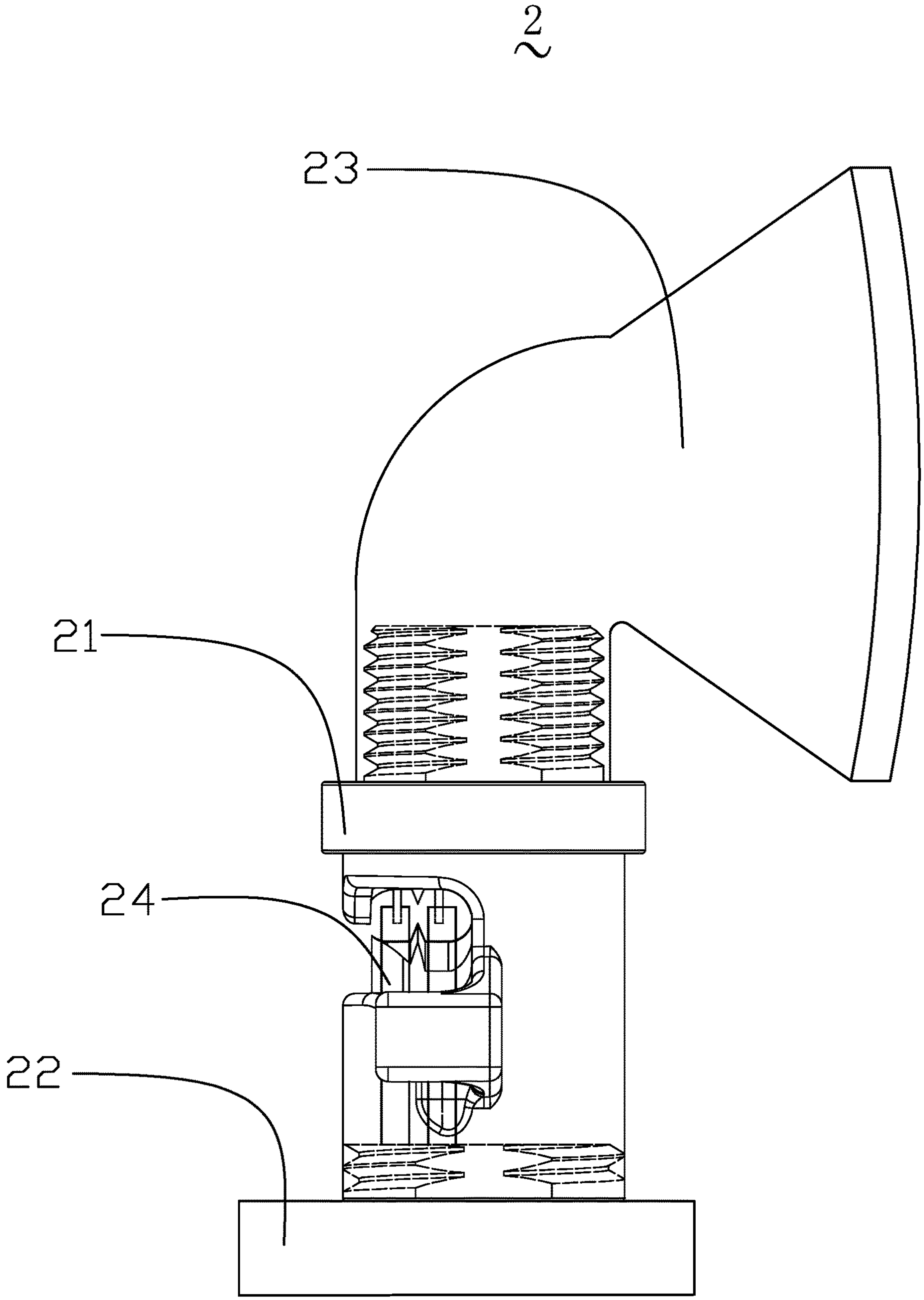
FIG. 11 is a perspective view of a lamp according to a second embodiment of the present disclosure.
Figure 12:
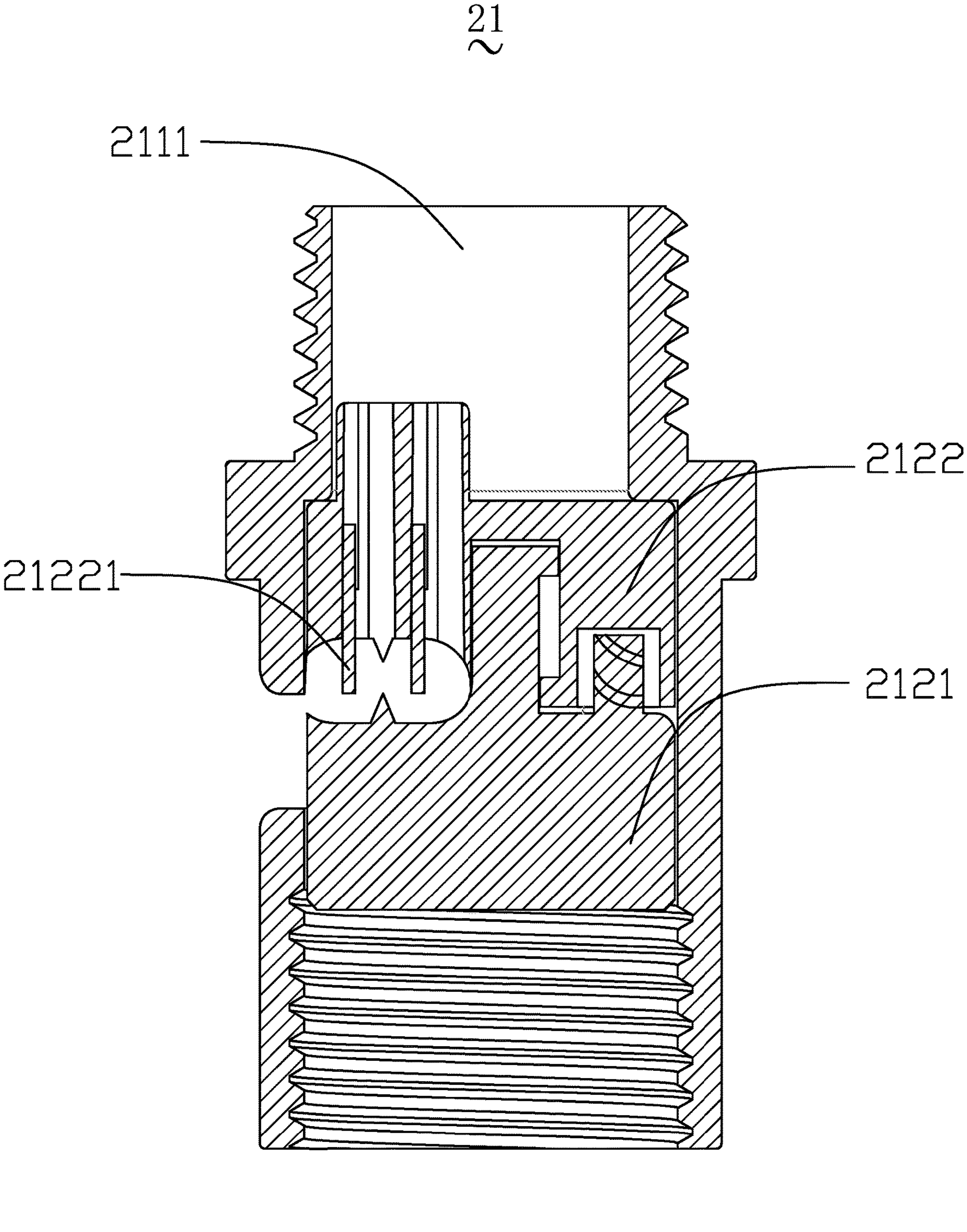
FIG. 12 is a cross-sectional schematic diagram of the lamp according to the second embodiment of the present disclosure.

Referring to FIG. 11 and FIG. 12, a second embodiment of the present disclosure provides a lamp 2. The lamp 2 includes a lamp body 23 and a connecting member 21. The connecting member 21 is the connecting member 1 provided by the first embodiment of the present disclosure. The lamp body 23 is electrically connected to a power cable 24 through connecting member 21. The lamp 2 further includes a base 22. The lamp body 23 is detachably connected to the base 22 through the connecting member 21. The lamp body 23 is electrically connected to external power cable through the connecting member 21. The base 22 is detachably connected to an end of the connecting member 21 close to a limiting member 2121. During the process of connecting the base 22 and the connecting member 21, the base 22 drives the limiting member 2121 to move toward a conductive member 2122 in a tube chamber 2111, and a pierce structure 21221 pierces the power cable 24, so that the lamp body 23 is electrically connected to the power cable 24 through the pierce structure 21221.

It can be understood that, the lamp 2 has the same beneficial effects as the connecting member 1 provided by the first embodiment of the present disclosure, which will not be repeated here.

The foregoing descriptions of the embodiments according to the present disclosure should not be construed as limiting the scope of the disclosure but as merely providing illustrations of some of the preferred embodiments thereof. Thus the scope of the disclosure should be determined by the appended claims and their legal equivalents. Furthermore, it will be apparent to those skilled in the art that various modifications, equivalents and improvements can be made herein within the scope of the disclosure.

The invention claimed is:

1. A connecting member for connecting a lamp body and a power cable, wherein the connecting member comprises a tube body and a fastening member, the tube body defining an axial hollow tube chamber and a gap communicated with the tube chamber, the fastening member disposed in the tube chamber and corresponding to the gap;

the fastening member comprises a limiting member and a conductive member movably connected to the limiting member, the limiting member partially exposed from the gap and forming a supporting portion for supporting the power cable, the conductive member comprising a pierce structure corresponding to the supporting portion; when the connecting member connects the lamp body and the power cable, the distance between the limiting member and the conductive member reducing, and the pierce structure piercing the power cable supported on the supporting portion and electrically connected to the power cable.

2. The connecting member according to claim 1, wherein a blocking element is disposed at an end of an inner wall of the tube chamber close to the conductive member, the blocking element connected to an end of the conductive member away from the limiting member, to limit the conductive member;

or, a blocking element is disposed at an end of the inner wall of the tube chamber close to the limiting member, the blocking element connected to an end of the limiting member away from the conductive member, to limit the limiting member.

3. The connecting member according to claim 2, wherein the blocking element is a protrusion disposed on the inner wall of the tube chamber, when the blocking element is disposed at the end of the inner wall of the tube chamber close to the limiting member, the blocking element abutting against the end of the limiting member away from the conductive member, to limit the limiting member;

when the blocking element is disposed at the end of the inner wall of the tube chamber close to the conductive member, the blocking element abutting against the end of the conductive member away from the limiting member, to limit the conductive member.

4. The connecting member according to claim 3, wherein the protrusion may be spaced protrusions or an annular protrusion.

5. The connecting member according to claim 1, wherein two opposite ends of the limiting member and the conductive member are respectively provided with a limiting portion and a limiting slot that are structurally matched, the limiting portion sliding in the limiting slot.

6. The connecting member according to claim 5, wherein the limiting portion is disposed at an end of the limiting member opposite to the conductive member, and the limiting slot is defined at an end of the conductive member opposite to the limiting member; the limiting slot on the conductive member is provided with a first block at an end thereof close to the limiting member, and the limiting portion on the limiting member is provided with a second block at an end thereof close to the conductive member; the first block abutting against the second block to limit the limiting portion in the limiting slot.

7. The connecting member according to claim 3, wherein the conductive member defines a groove at an end thereof close to the limiting member, and the limiting member comprises a lug corresponding to the groove, and a spring is sleeved on the lug; when the spring abuts against the bottom of the groove, the spring deformed.

8. The connecting member according to claim 1, wherein the conductive member defines a wire hole corresponding to the supporting portion, and the lamp body is electrically connected to the pierce structure via the wire hole to obtain power supply.

9. The connecting member according to claim 1, wherein the pierce structure comprises at least two prods, and the supporting portion defines at least two supporting places corresponding to the at least two prods.

10. The connecting member according to claim 9, wherein the number of the prods is two, the two prods electrically connected to positive and negative electrodes of the power cable.

11. The connecting member according to claim 9, wherein the conductive member defines a wire hole corresponding to the supporting portion, and the at least two prods are disposed in the wire hole and are detachably connected to the conductive member.

12. The connecting member according to claim 9, wherein a first protrusion is disposed between the at least two supporting places to separate the at least two supporting places.

13. The connecting member according to claim 12, wherein the conductive member comprises a second protrusion thereon corresponding to and matching the first protrusion, for separating the at least two prods.

14. The connecting member according to claim 1, wherein a locking portion is formed at two opposite sides of the gap, for fixing the power cable, and an angle is formed between the locking portion and the supporting portion.

15. The connecting member according to claim 14, wherein the locking portion is formed at a side of the gap away from the conductive member, and the locking portion is an L-shaped crank arm formed by the tube body extending in a radial direction.

16. The connecting member according to claim 2, wherein an end of the tube body away from the blocking element is provided with threads, and an outer wall of the other end of the tube body is provided with threads, or a rotating element is disposed at the other end of the tube body.

17. A lamp, comprising a lamp body and the connecting member of claim 1, wherein the lamp body is electrically connected to a power cable through the connecting member.

18. The lamp according to claim 17, wherein the lamp further comprises a base, the lamp body detachably connected to the base through the connecting member, the lamp body connected to an end of the connecting member close to the conductive member thereof, and the base detachably connected to an end of the connecting member close to the limiting member thereof; during the process of connecting the base and the connecting member, the base driving the limiting member to move toward the conductive member in a tube chamber, and a pierce structure piercing the power cable, so that the lamp body is electrically connected to the power cable through the pierce structure.

19. A connecting member of ground lamps, for electrically connecting a lamp body and a power cable, comprising a hollow tube body, wherein the tube body defines a gap on a wall thereof communicated with the tube body;

a pierce structure is disposed in the tube body; and a supporting portion is disposed opposite to the pierce structure on the tube body, which is removable relative to the pierce structure;

when a power cable is located at the gap, and the supporting portion moves toward the pierce structure, the power cable can be supported by the supporting portion, and the pierce structure piercing the power cable to electrically connect the lamp body and the power cable.

20. The connecting member of ground lamps according to claim 19, wherein the supporting portion is spaced to define at least two supporting places, and the pierce structure comprises at least two prods corresponding to the at least two supporting places.

* * * * *